United States Patent
Goto

(10) Patent No.: US 7,923,407 B2
(45) Date of Patent: Apr. 12, 2011

(54) CATALYST FOR EXHAUST GAS PURIFICATION, PRODUCTION METHOD THEREFOR, AND METHOD FOR PURIFICATION OF EXHAUST GAS USING THE CATALYST

(75) Inventor: Hideki Goto, Himeji (JP)

(73) Assignees: ICT Co., Ltd., Chuo-Ku, Osaka-Shi (JP); International Catalyst Technology, Inc., Auburn Hills, MI (US)

( * ) Notice: Subject to any disclaimer, the term of this patent is extended or adjusted under 35 U.S.C. 154(b) by 571 days.

(21) Appl. No.: 11/685,962

(22) Filed: Mar. 14, 2007

(65) Prior Publication Data

US 2007/0219089 A1   Sep. 20, 2007

(30) Foreign Application Priority Data

Mar. 16, 2006   (JP) .................. 2006-073158

(51) Int. Cl.
*B01J 23/00* (2006.01)
*B01J 21/00* (2006.01)
*B01J 20/00* (2006.01)
*B01J 29/00* (2006.01)

(52) U.S. Cl. ........ 502/327; 502/328; 502/332; 502/333; 502/334; 502/339; 502/349; 502/350; 502/355; 502/415; 502/439

(58) Field of Classification Search .......... 502/327, 502/328, 332, 333, 334, 339, 349, 350, 355, 502/415, 439
See application file for complete search history.

(56) References Cited

U.S. PATENT DOCUMENTS

| 5,179,059 | A | 1/1993 | Domesle et al. |
| 5,260,249 | A | 11/1993 | Shiraishi et al. |
| 5,677,258 | A | 10/1997 | Kurokawa et al. |
| 5,702,675 | A | 12/1997 | Takeshima et al. |
| 6,294,140 | B1 * | 9/2001 | Mussmann et al. ........ 423/213.5 |
| 6,420,306 | B2 * | 7/2002 | Kurokawa et al. ............ 502/261 |
| 6,432,859 | B1 * | 8/2002 | Iwakuni et al. ................... 502/66 |
| 6,677,264 | B1 * | 1/2004 | Klein et al. ..................... 502/74 |
| 7,081,430 | B2 * | 7/2006 | Uenishi et al. ................ 502/327 |
| 7,265,073 | B2 * | 9/2007 | Yoshikawa ....................... 502/66 |
| 2001/0031699 | A1 | 10/2001 | Matsumoto et al. |
| 2002/0039549 | A1 | 4/2002 | Lindner et al. |
| 2002/0057997 | A1 | 5/2002 | Mizuno et al. |
| 2002/0061816 | A1 | 5/2002 | Uenishi et al. |
| 2003/0021745 | A1 * | 1/2003 | Chen .......................... 423/239.1 |

FOREIGN PATENT DOCUMENTS

| EP | 0 848 983 A1 | 6/1998 |
| JP | 9-057066 A | 3/1997 |
| JP | 10-052640 A | 2/1998 |
| KR | 0169112 | 1/1999 |

OTHER PUBLICATIONS

European Search Report dated Jul. 5, 2007.
European Office Action.
Office Action issued May 13, 2010, in corresponding Chinese Patent Application No. 200710087537.6, together with an English translation thereof.
Office Action issued Aug. 26, 2010 in corresponding Korean Patent Application No. 10-2007-0025228, together with an English translation thereof.
Office Action issued on Dec. 16, 2010, in corresponding European Patent Application No. 07104366.5.

* cited by examiner

*Primary Examiner* — Cam N Nguyen

(74) *Attorney, Agent, or Firm* — Buchanan Ingersoll & Rooney PC

(57) ABSTRACT

It is an object of the present invention to provide a catalyst for the exhaust gas purification having excellent ignition performance and NOx purification performance. The present invention provides a catalyst for the exhaust gas purification which comprises a catalytically active component (I) having palladium and barium supported on a refractory inorganic oxide (A); and a catalytically active component (II) having at least either of rhodium and platinum on a refractory inorganic oxide (B), a method for the production thereof, and a method for purifying an exhaust gas using such a catalyst.

9 Claims, No Drawings

CATALYST FOR EXHAUST GAS PURIFICATION, PRODUCTION METHOD THEREFOR, AND METHOD FOR PURIFICATION OF EXHAUST GAS USING THE CATALYST

BACKGROUND OF THE INVENTION

1. Field of the Invention

The present invention relates to a catalyst for the exhaust gas purification, a method for the production thereof, and a method for the purification of an exhaust gas using such a catalyst. More specifically, the present invention relates to a catalyst for the exhaust gas purification having excellent ignition performance and exhaust gas purification performance, in particular, NOx purification performance, a method for the production thereof, and a method for the purification of an exhaust gas using such a catalyst.

2. Description of the Related Art

To respond to variation of exhaust gas atmosphere from an engine, a three way catalyst comprising palladium, rhodium and platinum in combination has been heretofore used to efficiently purify CO (carbon monoxide), HC (hydrocarbon) and NOx (nitrogen oxide).

Also, the addition of an alkaline earth metal to the three way catalyst has been known to enhance catalytic action of palladium. Therefore, for example, JP-A-9-57066 discloses a catalyst for the exhaust gas purification which is formed by providing on a honeycomb-like monolithic carrier a first catalyst layer containing a refractory inorganic substance on which one or more members of precious metals selected from the group consisting of platinum (Pt), palladium (Pd) and rhodium (Rh) are supported, and further providing on the first catalyst layer a second catalyst layer containing an inorganic substance mainly composed of a porous crystalline aluminosilicate on which a copper (Cu) component is supported, characterized in incorporating a barium (Ba) component in the first catalyst layer. In addition, JP-A-10-52640 discloses a catalyst for the exhaust gas purification, characterized in covering a monolithic structure with a catalytically active component containing (a) a palladium and an alkaline earth metal oxide, (b) a zirconium oxide having lanthanum and cerium supported thereon, and (c) a refractory inorganic oxide. US-A-2001-31699 discloses a catalyst for the exhaust gas purification which comprises a cylinder-like carrier having a lot of through holes, each of the holes penetrating in an axis direction; a supporting layer of a refractory inorganic oxide formed at the inner surface which partitions the through holes; and a catalyst component of a precious metal supported on the supporting layer, and composed of an upstream side catalyst arranged at the upstream side relative to exhaust gas flow and a downstream side catalyst arranged at the downstream side relative to exhaust gas flow, characterized in that the upstream side catalyst contains one member selected among palladium, palladium and rhodium, or palladium and platinum as the precious metal; the supporting layer contains at least barium, and alumina containing lanthanum; the downstream side catalyst contains at least one member selected among platinum, palladium and rhodium as the precious metal; and the supporting layer contains at least one member selected among alumina containing lanthanum, a solid solution of cerium, or cerium and zirconium, and a solid solution of cerium and zirconium and yttrium.

As described above, although an alkaline earth metal is useful to palladium, it may be catalytic poison, in particular, to rhodium. Accordingly, co-presence of an alkaline earth metal with rhodium, as described in JP-A-9-57066 and US-A-2001-31699, incurs a problem of lowering NOx purification capacity by rhodium, or lowering oxidation performance.

On the other hand, although rhodium has very high NOx purification capacity, its amount used in catalyst components should be limited, due to being very expensive. Accordingly, in a catalyst for the exhaust gas purification as described in JP-A-10-52640, because rhodium is not used, further enhancement of NOx purification capacity must be required or has a problem of lowering oxidation performance.

Therefore, presence of rhodium is essential as a component of a catalyst for the exhaust gas purification, and maximal utilization of catalytic action thereof is required.

SUMMARY OF THE INVENTION

Accordingly, the present invention has been made in consideration of the above circumstances; and has an object to provide a catalyst for the exhaust gas purification which can suppress a trade-off on catalytic action of palladium and rhodium caused by addition of an alkaline earth metal, after thermal deterioration by, for example, exposure to exhaust gas at a high temperature, and has excellent ignition performance and exhaust gas purification performance, in particular, NOx purification performance.

Another object of the present invention is to provide a method, which is capable of efficiently producing the catalyst for the exhaust gas purification as described above.

A separate object of the present invention is to provide a method for purifying an exhaust gas using the catalyst for the exhaust gas purification.

The present inventors have intensively studied a way to attain the above objects, to find that adverse effects of an alkaline earth metal on rhodium can be suppressed and prevented by separately preparing a catalytically active component having palladium and barium supported on a refractory inorganic oxide at an optimal ratio, and a catalytically active component having platinum and/or rhodium supported on a refractory inorganic oxide, supporting these components on a refractory three-dimensional structure. Accordingly, it has been also found that the resultant catalyst for the exhaust gas purification obtained by using these catalytically active components can enhance exhaust gas purification performance of palladium by an alkaline earth metal, while maintaining NOx purification performance by rhodium, thus providing significantly excellent exhaust gas purification performance, in particular, NOx purification performance, as well as excellent ignition performance. On such a knowledge, the present invention has been accomplished.

Namely, the above objects can be attained by a catalyst for the exhaust gas purification which comprises a catalytically active component (I) having palladium and barium supported on a refractory inorganic oxide (A) at an optimal ratio; and a catalytically active component (II) having platinum and/or rhodium supported on a refractory inorganic oxide (B).

According to the present invention, a catalyst for the exhaust gas purification having excellent ignition performance and exhaust gas purification performance, in particular, NOx purification performance can be provided. In addition, according to the present invention, a catalyst for the exhaust gas purification can be produced using a conventional apparatus. Furthermore, according to the present invention, a method for purifying exhaust gas having excellent light-off performance and also having improved NOx purification performance under rich conditions can be provided.

The above and other objects, features and advantages of the present invention will become clear from the following description of the preferred embodiments.

DESCRIPTION OF THE PREFERRED EMBODIMENTS

A first aspect of the present invention relates to a catalyst for the exhaust gas purification which comprises a catalytically active component (I) having palladium and barium supported on a refractory inorganic oxide (A); and a catalytically active component (II) having at least either of rhodium and platinum on a refractory inorganic oxide (B).

The present invention will be explained in detail below.

1. Catalytically Active Component (I)

A catalytically active component (I) comprises palladium (Pd) and barium (Ba) supported on a refractory inorganic oxide (A). In a three way catalyst (hereafter may be referred to also as "TWC") containing Pd, it has been well known that the addition of Ba enhances catalytic activity.

In the present invention, the amount of palladium to be supported is not especially limited and may depend on conditions of using a catalyst, amount of barium or the like. The amount of palladium to be supported is usually and preferably in the range of 0.2 to 30 g, and more preferably 0.5 to 10 g, per liter of the catalyst for the exhaust gas purification of the present invention. Use of palladium in such a range can attain sufficient exhaust gas purification performance, in particular, HC purification performance. In the present invention, an amount of a precious metal including palladium, rhodium, and platinum to be supported is defined as an amount of the metal of itself. An amount of another metal (for example, barium) to be supported is defined as reduced to as an amount of metal oxide.

The amount of barium to be supported is also note specially limited, as long as it be an amount capable of enhancing exhaust gas purification performance of palladium, and may depend on conditions of using a catalyst, amount of palladium or the like. The amount of barium to be supported is usually such an amount as that a molar ratio of barium to palladium (molar ratio of barium/palladium) exceeds 0 and of not more than 2, exceeds 0 and below 1, exceeds 0 and of not more than 0.85, and exceeds 0 and of not more than 0.75, preferably in this order. In this case, the molar ratio of barium/palladium used herein represents a molar ratio each of the metal of itself. In addition, although the lower limit of the molar ratio of barium/palladium is always 0, it is preferably 0.1, and particularly preferably 0.2. The amount within such a range can attain sufficient enhancement of exhaust gas purification performance, in particular, NOx purification performance and HC purification performance of palladium by barium, while sufficiently suppressing and preventing catalytic poison effects by barium on Pt or Rh, particularly Rh.

In addition, as will be described in detail, in the case where the barium is added in Ba ion form like of barium hydroxide, barium carbonate, barium acetate, barium nitrate or the like, barium is considered to take a form of barium carbonate, barium oxide, barium nitrate, or barium sulfate in a catalyst layer after calcining, depending on acid in slurry or calcining temperature. Barium in such a form is unstable, since it takes a stable form like barium sulfate, and easily dissolves during catalyst preparation depending on pH value. However, it can easily exert co-catalyst effects to Pd. Therefore, barium is added more preferably in an ion form as described above than in a stable form like barium sulfate. In TWC, in view of catalytic performance, the combination of Pd and Pt, Pt/Rh, or Rh has been commonly known. However, as described above, barium that is effective to Pd may be catalytic poison to Pt or Rh, in particular, Rh. Therefore, use of a large quantity of barium ion form could impair general catalytic performance, and thus careful determination of amount of barium to be supported (amount of barium to be used) is required to enhance general performance as a catalyst.

In the present invention, the shape and size of barium and palladium is not especially limited. Barium and palladium may take any shape of, for example, granule-like, fine particle-like, powder-like, cylinder-like, circular cone-like, rectangular column-like, cube-like, pyramid-like, or irregular shape. Preferably, barium and palladium may be in a granular, fine particle, or powdery form. In the case where palladium takes a granular, fine particle, or powdery form, although average particle diameter of palladium is not especially limited, it is preferably in the range of, for example, 2 to 20 nm, and more preferably 4 to 6 nm. The average particle diameter within such a range can attain support of barium in a sufficient amount on a refractory inorganic oxide (A). In addition, in the present invention, each of the shapes and the average particle diameters of barium and palladium may be the same or different. In addition, "average particle diameter" of palladium can be measured by crystallite diameter determined by half-width of a diffraction peak of a catalyst component in X-ray diffraction, or average value of particle diameters of a catalyst component determined by a transmission electron microscope.

As the refractory inorganic oxide (A) on which palladium and barium are supported, any refractory inorganic oxide which has been usually used in exhaust gas processing may be used, and not especially limited. For example, as the refractory inorganic oxide (A), those having high surface area such as activated alumina, silica, zirconia, titania, ceria and the like, or composite oxides thereof may be included. Among these, activated alumina, zirconia, and ceria are preferable, and activated alumina is particularly preferable. In addition, the refractory inorganic oxide (A) may be used either alone or in a mixed form of 2 or more members.

Although the shape or the specific surface area of the refractory inorganic oxide (A) is not especially limited, such one is preferable that is capable of supporting Pd or Ba in high dispersion state. The refractory inorganic oxide (A) may take any shape of, for example, granule-like, fine particle-like, powder-like, cylinder-like, circular cone-like, rectangular column-like, cube-like, pyramid-like, or irregular shape. Preferably, the refractory inorganic oxide (A) may be in a granular, fine particle, or powdery form. In the case where the refractory inorganic oxide (A) takes a granular, fine particle, or powdery form, although average particle diameter of the refractory inorganic oxide (A) is not especially limited, it is preferably in the range of, for example, 1 to 20 μm, more preferably 1 to 10 μm, and most preferably 3 to 6 μm. The average particle diameter within such a range can attain support of Pd and Ba in sufficient amounts thereon. In this case, the "average particle diameter" of the refractory inorganic oxide (A) as used herein can be measured by average value of the particle diameters of the refractory inorganic oxide (A) measured by a well-known method like classification or the like.

In addition, BET specific surface area of the refractory inorganic oxide (A) may be any value, as long as it be sufficient for supporting Pd or Ba in high dispersion state. It is preferably in the range of 50 to 300 $m^2/g$, and more preferably 100 to 250 $m^2/g$. The specific surface area within this range can attain support of Pd and Ba in a sufficient amount on the refractory inorganic oxide (A).

The catalytically active component (I) can be obtained by supporting palladium and barium on the refractory inorganic oxide (A). A method for supporting Pd and Ba on the refractory inorganic oxide (A) is not especially limited, and a well-known supporting method may be used similarly or by suitable modification, in accordance with a method for catalyst preparation which has been commonly used in the art. Although a preferable method for supporting Pd and Ba on the refractory inorganic oxide (A) according to the present invention will be described below, the present invention should not be by no means limited to the following method.

For example, the catalytically active component (I) can be obtained by impregnating the refractory inorganic oxide (A) into an aqueous solution or aqueous slurry obtained by using a suitable palladium source or barium source, followed by drying and calcining the impregnated refractory inorganic oxide (A). In this case, the palladium source and barium source may be prepared as either of a separate aqueous solution or aqueous slurry, or as the same aqueous solution or aqueous slurry.

In the above method, the palladium (Pd) source as starting material is not especially limited, and any raw material which has been used in the field of exhaust gas purification may be used. Specifically, palladium; a halide like palladium chloride; inorganic salts such as a nitrate, a sulfate, an ammonium salt, an amine salt, a carbonate, a bicarbonate, a nitrite, and an oxalate, of palladium; a carboxylate like formate of palladium; and a hydroxide, an alkoxide, and an oxide of palladium; and the like may be included. A nitrate, an ammonium salt, an amine salt, and a carbonate of palladium are preferably included, and a nitrate (palladium nitrate) is more preferable. In the present invention, the palladium source may be used either alone or in a mixed form of 2 or more members.

Although the amount of Pd to be supported on the refractory inorganic oxide (A) is preferably such an amount so as to give an amount per liter of a catalyst as described above, it is preferably in the range of 0.1 to 30% by weight, more preferably 0.3 to 25% by weight, based on the weight of the refractory inorganic oxide (A).

In addition, the barium (Ba) source as starting material is not especially limited, and any raw material which has been used in the field of exhaust gas purification may be used. Specifically, barium; oxides such as barium oxide, barium peroxide, barium titanate, barium chromate; a halide like barium chloride; barium salts such as barium sulfate, barium hydroxide, barium carbonate, and barium nitrate and the like may be included. Among these, barium is preferably present in a Ba ion form in an aqueous solution rather than the addition in a stable form like barium sulfate. Accordingly, a water-soluble barium, for example, barium hydroxide, barium carbonate, barium acetate, barium oxalate, or barium nitrate may be preferably used in the preparation of the catalytically active component (I). More preferably, barium hydroxide, barium carbonate, barium acetate, barium oxalate, and barium nitrate may be used. Most preferably, barium hydroxide, barium acetate, and barium oxalate may be used in view of catalytic activity. In the present invention, the barium source may be used either alone or in a mixed form of 2 or more members.

The amount of Ba to be supported on the refractory inorganic oxide (A) is preferably such amount as being present in a specific molar ratio relative to palladium (Pd) as described above. It is preferably in the range of 0.05 to 30% by weight, and more preferably 0.1 to 25% by weight, based on the weight of the refractory inorganic oxide (A).

Into the resultant aqueous solution or aqueous slurry thus prepared as above and containing the palladium source and barium source, the refractory inorganic oxide (A) is impregnated. In this case, impregnation conditions are not especially limited, as long as it provide sufficient and homogeneous mixing of the palladium source and barium source with the refractory inorganic oxide (A), and these Pd and Ba can be sufficiently supported on the refractory inorganic oxide (A) in the subsequent drying and calcining steps. For example, the refractory in organic oxide (A) may be impregnated in the aqueous solution or aqueous slurry containing the palladium source and barium source, and then dried at 100 to 150° C. In this case, the aqueous solution or aqueous slurry may be preferably stirred every 10 minutes, for example, so as to make the Pd and Ba uniformly impregnated in or supported on the refractory inorganic oxide (A). Subsequently, the resultant dried powdery refractory inorganic oxide (A) from which water has been removed may be dried intact a whole day and night, and then calcined at 350 to 600° C. for one to two hours, to prepare the catalytically active component (I).

2. Catalytically Active Component (II)

A catalytically active component (II) comprises at least either of platinum (Pt) and rhodium (Rh) supported on the refractory in organic oxide (B). In this case, at least rhodium (Rh) is preferably supported on the refractory inorganic oxide (B).

In the present invention, in the case where rhodium is used, the amount of rhodium to be supported is not especially limited, and may depend on conditions of using a catalyst, or amount of platinum in the case where platinum is used in combination, or the like. The amount of rhodium to be supported is usually and preferably in the range of 0.01 to 5 g, and more preferably 0.1 to 1 g, per liter of the catalyst for the exhaust gas purification of the present invention. Use of rhodium within such a range can attain sufficient exhaust gas purification performance, in particular, NOx purification capacity.

In the case where platinum is used, the amount of platinum to be supported is not especially limited, and may depend on conditions of using a catalyst or amount of rhodium in the case where rhodium is used in combination, or the like. The amount of platinum to be supported is usually and preferably in the range of 0.01 to 10 g, and more preferably 0.02 to 2 g, per liter of the catalyst for the exhaust gas purification of the present invention. Use of platinum within such a range can attain sufficient exhaust gas purification performance.

In addition, in the case where rhodium and platinum are used in combination, mixing ratio of rhodium and platinum is not especially limited, and may depend on conditions of using a catalyst, or desired gas purification performance, or the like. Preferably, the ratio of platinum to rhodium (weight ratio of Pt/Rh) is not more than 5, more preferably not more than 3, and most preferably not more than 1. In this case, the ratio of Pt/Rh exceeding 5 may not sufficiently exert catalytic function by rhodium. In addition, although the lower limit of the ratio of platinum to rhodium (weight ratio of Pt/Rh) is not especially limited, in consideration of catalytic performance by platinum, it is usually not less than 1/5, and more preferably not less than 1/3.

In the present invention, the shape and size of rhodium and platinum is not especially limited. Rhodium and platinum may take any shape of, for example, granule-like, fine particle-like, powder-like, cylinder-like, circular cone-like, rectangular column-like, cube-like, pyramid-like, or irregular shape. Preferably, rhodium and platinum may be in a granular, fine particle, or powdery form. In the case where rhodium and platinum take a granular, fine particle, or powdery form, although average particle diameters of rhodium and platinum are not especially limited, they may be preferably such an amount so as to make sufficient amounts of platinum and rhodium supported on a refractory inorganic oxide (B). In this case, each of the shapes and the average particle diameters of rhodium and platinum may be the same or different.

As the refractory inorganic oxide (B) on which platinum and rhodium are supported, any refractory inorganic oxide which has been usually used in exhaust gas processing may be used, and not especially limited. For example, as the refractory inorganic oxide (B), those having high surface area such as activated alumina, silica, zirconia, titania, ceria and the like, or composite oxides thereof may be included. Among these, activated alumina, zirconia, and ceria are preferable, and zirconia is particularly preferable. In addition, the refractory inorganic oxide (B) maybe used either alone or in a mixed form of 2 or more members. In addition, the refractory inorganic oxide (B) may be the same as or different from the refractory inorganic oxide (A).

Although the shape or the specific surface area of the refractory inorganic oxide (B) is not especially limited, such one is preferable that is capable of supporting Pt and Rh in high dispersion state. The refractory inorganic oxide (B) may take any shape of, for example, granule-like, fine particle-like, powder-like, cylinder-like, circular cone-like, rectangular column-like, cube-like, pyramid-like, or irregular shape. Preferably, the refractory inorganic oxide (B) may be in a granular, fine particle, or powdery form. In the case where the refractory inorganic oxide (B) takes a granular, fine particle, or powdery form, although average particle diameter of the refractory inorganic oxide (B) is not especially limited, it is preferably in the range of, for example, 1 to 20 µm, more preferably 1 to 10 µm, and most preferably 3 to 6 µm. The average particle diameter within such a range can attain support of Pt and Rh in sufficient amounts thereon. In this case, the "average particle diameter" of the refractory inorganic oxide (B) as used herein can be measured by average value of the particle diameters of the refractory inorganic oxide (B) measured by a well-known method like classification or the like.

In addition, BET specific surface area of the refractory inorganic oxide (B) may be any value, as long as it be sufficient for supporting Pt and/or Rh in high dispersion state. It is preferably in the range of 50 to 300 m$^2$/g, and more preferably 100 to 250 m$^2$/g. The specific surface area within this range can attain support of Pt and/or Rh in a sufficient amount on the refractory inorganic oxide (B).

The catalytically active component (II) can be obtained by supporting rhodium and/or platinum on the refractory inorganic oxide (B). A method for supporting Pt and/or Rh on the refractory inorganic oxide (B) is note specially limited, and a well-known supporting method may be used similarly or by suitable modification, in accordance with a method for catalyst preparation which has been commonly used in the art. Although a preferable method for supporting Pt and Rh onto the refractory inorganic oxide (B) according to the present invention will be described below, the present invention should not be by no means limited to the following method.

For example, the same method as described for the method for the preparation of catalytically active component (I) may be used. Namely, the catalytically active component (II) can be obtained by impregnating the refractory inorganic oxide (B) into an aqueous solution or aqueous slurry obtained by using a suitable platinum source or rhodium source, followed by drying and calcining the impregnated refractory inorganic oxide (B). In this case, the platinum source and rhodium source may be prepared as either of a separate aqueous solution or aqueous slurry, or as the same aqueous solution or aqueous slurry.

In the above method, the platinum source as starting material is not especially limited, and any raw material which has been used in the field of exhaust gas purification may be used. Specifically, platinum; a halide such as platinum bromide, platinum chloride, or the like; inorganic salts such as a nitrate, a dinitrodiammime salt, sulfate, an ammonium salt, an amine salt, a carbonate, a bicarbonate, a nitrite, and an oxalate, of platinum; a carboxylate like formate of platinum; and a hydroxide, an alkoxide, and an oxide of platinum; and the like may be included. A nitrate, and a dinitrodiammine salt of platinum are preferably included, and a dinitorodiammine salt (dinitorodiammine platinum) is more preferable. In addition, in the present invention, the platinum source may be used either alone or in a mixed form of 2 or more members.

Although the amount of Pt to be supported on the refractory inorganic oxide (B) is preferably such an amount so as to give an amount per liter of a catalyst as described above, it is preferably in the range of 0.005 to 25% by weight, more preferably 0.01 to 5% by weight, based on the weight of the refractory inorganic oxide (B).

In addition, the rhodium source as starting material is not especially limited, and any raw material which has been used in the field of exhaust gas purification may be used. Specifically, rhodium; a halide like rhodium chloride; inorganic salts such as a nitrate, a sulfate, an ammonium salt, an amine salt, a carbonate, a bicarbonate, a nitrite, and an oxalate, of rhodium; a carboxylate like formate of rhodium; and a hydroxide, an alkoxide, and an oxide of rhodium; and the like may be included. A nitrate, an ammonium salt, an amine salt, and a carbonate of rhodium are preferable; and a nitrate (rhodium nitrate) is more preferable.

Although the amount of Rh to be supported on the refractory inorganic oxide (B) is preferably such an amount so as to give an amount per liter of a catalyst as described above, it is preferably in the range of 0.005 to 12% by weight, more preferably 0.1 to 3% by weight, based on the weight of the refractory inorganic oxide (B).

Furthermore, in the case where rhodium and platinum are used in combination, although composition of rhodium and platinum is not especially limited, each metal may be preferably supported on the refractory inorganic oxide (B) so as to give the supported amounts and the mixing ratio as described above.

Into the resultant aqueous solution or aqueous slurry thus prepared as above and containing the platinum source and/or the rhodium source, the refractory inorganic oxide (B) is impregnated. In this case, impregnation conditions are not especially limited, as long as it provide sufficient and homogeneous mixing of the platinum source and/or the rhodium source with the refractory inorganic oxide (B), and these Pt and Rh can be sufficiently supported on the refractory inorganic oxide (B) in the subsequent drying and calcining steps. For example, the refractory inorganic oxide (B) may be impregnated in the aqueous solution or aqueous slurry containing the platinum source and/or the rhodium source, and then dried at 100 to 150° C. In this case, the aqueous solution or aqueous slurry may be preferably stirred every 10 minutes, for example, so as to make the Pt and Rh uniformly impregnated in or supported on the refractory inorganic oxide (B). Subsequently, the resultant dried powdery refractory inorganic oxide (B) from which water has been removed may be dried intact a whole day and night, and then calcined at 350 to 600° C. for one to two hours, to prepare the catalytically active component (II).

3. Catalyst for the Exhaust Gas Purification

The catalyst for the exhaust gas purification of the present invention comprises the catalytically active component (I) and the catalytically active component (II) as essential components.

The amount of the catalytically active component (I) to be used (supported) is not especially limited, and can be suitably selected, depending on the kind or amount of a refractory three-dimensional structure to be described in detail below, or the catalytically active component (II), desired exhaust gas purification performance, or the like. The amount of the catalytically active component (I) to be used (supported) is preferably in the range of 10 to 300 g, more preferably 15 to 200 g, and most preferably 30 to 150 g, per liter of the catalyst for the exhaust gas purification. In this case, the supporting amount of the catalytically active component (I) below 10 g may not provide sufficient effects of the catalytically active component (I), and thus may not attain desired exhaust gas purification properties. On the contrary, even if the supporting amount of the catalytically active component (I) exceeds 300 g, effects comparative to such additional amount cannot be obtained.

The amount of the catalytically active component (II) to be used (supported) is also not especially limited, and can be suitably selected, depending on the kind or amount of a refractory three-dimensional structure to be described in detail below, or the catalytically active component (I), desired exhaust gas purification performance, or the like. The amount of the catalytically active component (II) to be used (supported) is preferably in the range of 10 to 300 g, more preferably 15 to 200 g, and most preferably 30 to 150 g, per liter of the catalyst for the exhaust gas purification. In this case, the supporting amount of the catalytically active component (II) below 10 g may not provide sufficient effects of the catalytically active component (II), and thus may not attain desired exhaust gas purification properties. On the contrary, even if the supporting amount of the catalytically active component (II) exceeds 300 g, effects comparative to such additional amount cannot be obtained.

In the present invention, the mixing ratio of the catalytically active component (I) and the catalytically active component (II) is also not especially limited, and can be suitably selected, depending on the kind or amount of a refractory three-dimensional structure to be described in detail below, or the catalytically active components (I) or (II), desired exhaust gas purification performance, or the like. The weight ratio the catalytically active component (I) and the catalytically active component (II) (weight ratio of the catalytically active component (I): the catalytically active component (II)) is preferably in the range of 1:30 to 30:1, more preferably 3:40 to 40:3, and most preferably 1:5 to 5:1. In this case, if the mixing ratio deviate from this range, the balance between the catalytically active component (I) and the catalytically active component (II) would be disrupted and the catalyst may not be provide sufficient exhaust gas purification properties desired.

The catalyst for the exhaust gas purification of the present invention contains the catalytically active components (I) and (II) as essential components. In addition to these, another component(s) (additional component(s)) may be added. As the additional component, rare earth metals such as scandium (Sc), yttrium (Y), lanthanum (La), cerium (Ce), praseodymium (Pr), and neodymium (Nd); metals such as zirconium (Zr), iron (Fe), cobalt (Co) and nickel (Ni); oxides of the above-described metals; composite oxides of the above-described metals and the like may be included. Among these, oxides of Zr, Ce, La, Y, Nd, and Pr, or composite oxides thereof are preferable, and oxides of Zr, Ce, and La, or composite oxides thereof are more preferable. Such an additional component may be used either alone or in a mixed form of 2 or more members. In addition, the amount of these additional component to be added is not especially limited, as long as not to inhibit action by the catalytically active components (I) and (II). The amount of the component to be added is preferably in the range of 1 to 100 g, and more preferably 5 to 70 g, per liter of the catalyst for the exhaust gas purification of the present invention.

The locations of the catalytically active component (I) and the catalytically active component (II) present in the catalyst for the exhaust gas purification of the present invention (structure of the catalyst for the exhaust gas purification) is not especially limited, as long as it be one containing the catalytically active component (I) and the catalytically active component (II) as essential components. Each of the components (I) and (II) may be present in different layers or in the same layer. Specifically, the catalyst for the exhaust gas purification of the present invention can have structures as follows; (a) a 2-layer structure having a surface layer containing the catalytically active component (I), and a lower layer containing the catalytically active component (II); (b) a 2-layer structure having a surface layer containing the catalytically active component (II), and a lower layer containing the catalytically active component (I); and (c) a single-layer structure having a layer containing the catalytically active component (I) and the catalytically active component (II). In any of the structures (a) to (c), the same amount and ratio as described above are applied to the amount and ratio of the catalytically active components (I) and (II).

A method for the production of catalyst for the exhaust gas purification having the structure (a) above is not especially limited, and any well-known method for the production of a laminated type catalyst may be used similarly, or by suitable modification. Preferably, the catalyst for the exhaust gas purification having the structure (a) above can be obtained by supporting the catalytically active component (I) prepared as above on a refractory three-dimensional structure, to yield a precursor catalyst (I), and subsequently supporting the catalytically active component (II) prepared as above on the precursor catalyst (I) thus obtained. Namely, a second aspect of the present invention is to provide a method for the production of a catalyst for the exhaust gas purification which comprises a step of supporting palladium and barium on a refractory inorganic oxide (A) to yield a catalytically active component (I); a step of supporting at least either of rhodium and platinum on a refractory inorganic oxide (B) to yield a catalytically active component (II); a step of supporting the catalytically active component (I) on a refractory three-dimensional structure to yield a precursor catalyst (I); and a step of supporting the catalytically active component (II) on the precursor catalyst (I).

Similarly, a method for the production of catalyst for the exhaust gas purification having the structure (b) above is not especially limited, and any well-known method for the production of a laminated type catalyst may be used similarly, or by suitable modification. Preferably, the catalyst for the exhaust gas purification having the structure (b) above can be obtained by supporting the catalytically active component (II) prepared as above on a refractory three-dimensional structure, to yield a precursor catalyst (II), and subsequently supporting the catalytically active component (I) prepared as above on the precursor catalyst (II) thus obtained. Namely, a third aspect of the present invention is to provide a method for the production of a catalyst for the exhaust gas purification which comprises a step of supporting palladium and barium on a refractory inorganic oxide (A) to yield a catalytically active component (I); a step of supporting at least either of rhodium and platinum on a refractory inorganic oxide (B) to yield a catalytically active component (II); a step of supporting the catalytically active component (II) on a refractory three-dimensional structure to yield a precursor catalyst (II); and a step of supporting the catalytically active component (I) on the precursor catalyst (II).

In addition, a method for the production of catalyst for the exhaust gas purification having the structure (c) above is not especially limited, and any well-known method for the production of a catalyst may be used similarly, or by suitable modification. Preferably, the catalyst for the exhaust gas purification having the structure (c) above can be obtained by supporting the catalytically active components (I) and (II) prepared as above on a refractory three-dimensional structure. Namely, a fourth aspect of the present invention is to provide a method for the production of a catalyst for the exhaust gas purification which comprises a step of supporting palladium and barium on a refractory inorganic oxide (A) to yield a catalytically active component (I); a step of supporting at least either of rhodium and platinum on a refractory inorganic oxide (B) to yield a catalytically active component (II); and a step of supporting the catalytically active component (I) and the catalytically active component (II) on a refractory three-dimensional structure.

In the second aspect of the present invention, the precursor catalyst (I) can be obtained by supporting, first of all, the catalytically active component (I) on the refractory three-dimensional structure.

In the above step, aqueous slurry containing the catalytically active component (I) may be preferably prepared by dissolving/dispersing the catalytically active component (I) in a suitable aqueous medium, before being supported on the refractory three-dimensional structure, to yield a solution/dispersion of the catalytically active component (I), and then subjecting the resultant solution/dispersion of the catalytically active component (I) to wet-milling using a ball mill or the like. As the aqueous medium suitably used herein, water; lower alcohols such as cyclohexanol, ethanol, and 2-propanol, and the like; and aqueous solution of organic type alkaline, and the like may be included. Among these, water, and lower alcohols may be preferably used, and water may be particularly used. In this case, the amount of the catalytically active component (I) to be added is not especially limited, as long as the catalytically active component (I) can be supported in a desired amount on the refractory three-dimensional structure. Such amount is preferable so as to give a concentration of the catalytically active component (I) in the aqueous medium in the range of 20 to 60% by weight, and more preferably 30 to 50% by weight. In addition, the wet-milling of the solution/dispersion containing the catalytically active component (I) may be carried out by a usually well-known method, and not especially limited.

In the above step, the aqueous slurry containing the catalytically active component (I) may further contain, in addition to the catalytically active component (I), another component(s) (additional component(s)). As the additional component, rare earth metals such as scandium (Sc), yttrium (Y), lanthanum (La), cerium (Ce), praseodymium (Pr), and neodymium (Nd); metals such as zirconium (Zr), iron (Fe), cobalt (Co) and nickel (Ni); oxides of the above-described metals; composite oxides of the above-described metals and the like may be included. Among these, oxides of Zr, Ce, La, Y, Nd, and Pr, or composite oxides thereof are preferable, and oxides of Zr, Ce, and La, or composite oxides thereof are more preferable. Such an additional component may be used either alone or in a mixed form of 2 or more members. In addition, the amount of the additional component to be added is not especially limited, as long as not to inhibit action by the catalytically active component (I). The amount of the component to be added is preferably in the range of 5 to 400% by weight, and more preferably 10 to 200% by weight, based on the weight of the catalytically active component (I).

In the case where the solution/dispersion of the catalytically active component (I) contains an additional component, the solution/dispersion of the catalytically active component (I) may further contain a refractive inorganic oxide in addition to the additional component. As the refractory inorganic oxide, a refractory inorganic oxide which has been usually used in exhaust gas processing may be used, and is not especially limited. For example, as the refractory inorganic oxide, those having high surface area such as activated alumina, silica, zirconia, titania, ceria and the like, or composite oxides thereof may be included. Among these, activated alumina, zirconia, and ceria are preferable, and activated alumina is particularly preferable. In addition, the refractory inorganic oxide may be the same as or different from the refractory inorganic oxide (A). In addition, the refractory inorganic oxide may be used either alone or in a mixed form of 2 or more members.

The refractory three-dimensional structure is not especially limited, and similar material as well-known one may be used. For example, a cylindrical structure having a plurality of through holes penetrating in an axis direction, such as honeycomb, metal honeycomb, plug honeycomb, or metal mesh-like shape may preferably be used. Material of the refractory three-dimensional structure is not especially limited, and may include ceramics such as cordierite, mullite, or the like; metallic material such as Fe—Cr—Al alloy, stainless steel, or the like; metallic oxide such as alumina, silica, zirconia, titania, or the like; and a composite oxide thereof; zeolite, silica, or the like.

In the above step, although the amount of the catalytically active component (I) to be supported on the refractory three-dimensional structure is not especially limited, the amount to be specified in the amount of the catalytically active component (I) is preferable.

A method for supporting the catalytically active component (I) on the refractory three-dimensional structure is not especially limited, and a well-known method for supporting a catalyst can be applied similarly, or by suitable modification. Specifically, the refractory three-dimensional structure may be charged and impregnated into the aqueous slurry containing the catalytically active component (I). In this case, impregnation conditions are not especially limited, as long as it provide sufficient and uniform mixing of the catalytically active component (I) with the refractory three-dimensional structure, and the catalytically active component (I) can be sufficiently supported on the refractory three-dimensional structure in the subsequent drying and calcining steps. For example, the refractory three-dimensional structure may be impregnated in the aqueous slurry containing the catalytically active component (I); subsequently, the refractory three-dimensional structure may be pulled out from the aqueous slurry containing the catalytically active component (I), followed by removing excess aqueous slurry containing the catalytically active component (I). Then, the refractory three-dimensional structure may be dried at 100 to 200° C. for 0.2 to 1 hour and further calcined at 350 to 600° C. for 0.4 to 2 hours, to produce a precursor catalyst (I) having the catalytically active component (I) supported on the refractory three-dimensional structure.

Then, by supporting the catalytically active component (II) on the resultant precursor catalyst (I), the catalyst for the exhaust gas purification of the present invention can be obtained.

In the above step, aqueous slurry containing the catalytically active components (II) can be preferably prepared by dissolving/dispersing the catalytically active component (II) in a suitable aqueous medium, before being supported on the precursor catalyst (I), to yield a solution/dispersion of the catalytically active component (II), and then subjecting the resultant solution/dispersion of the catalytically active component (II) to wet-milling using a ball mill or the like. As the aqueous medium suitably used herein, water; lower alcohols such as cyclohexanol, ethanol, and 2-propanol, and the like; and aqueous solution of organic type alkaline, and the like may be included. Among these, water, and lower alcohols may be preferably used, and water may be particularly used. In this case, the aqueous medium used to prepare the aqueous slurry containing the catalytically active component (II) may be the same as or different from the aqueous medium used to prepare the aqueous slurry containing the catalytically active component (I). The amount of the catalytically active component (II) to be added is not especially limited, as long as the catalytically active component (II) can be supported in a desired amount on the precursor catalyst (I). Such amount is preferable so as to give a concentration of the catalytically active component (II) in the aqueous medium in the range of 20 to 60% by weight, and more preferably 30 to 50% by weight. In addition, the wet-milling of the solution/dispersion containing the catalytically active component (II) may be carried out by a usually well-known method, and not especially limited.

In the above step, the aqueous slurry containing the catalytically active component (II) may further contain, in addition to the catalytically active component (II), another component(s) (additional component(s)). As the additional component, rare earth metals such as scandium (Sc), yttrium (Y), lanthanum (La), cerium (Ce), praseodymium (Pr), and neodymium (Nd); metals such as zirconium (Zr), iron (Fe), cobalt (Co) and nickel (Ni); oxides of the above-described metals; composite oxides of the above-described metals and the like may be included. Among these, oxides of Zr, Ce, La, Y, Nd, and Pr, or composite oxides thereof are preferable, and oxides of Zr, Ce, and La, or composite oxides thereof are more preferable. Such an additional component may be used either alone or in a mixed form of 2 or more members. In addition, the amount of the additional component to be added is not especially limited, as long as not to inhibit action by the catalytically active component (II). The amount of the component to be added is preferably in the range of 5 to 400% by weight, and more preferably 10 to 200% by weight, based on the weight of the catalytically active component (II).

In the case where the solution/dispersion of the catalytically active component (II) contains an additional component, the solution/dispersion of the catalytically active component (II) may further contain a refractive inorganic oxide in addition to the additional component. As the refractory inorganic oxide, a refractory inorganic oxide which has been usually used in exhaust gas processing may be used, and is not especially limited. For example, as the refractory inorganic oxide, those having high surface area such as activated alumina, silica, zirconia, titania, ceria and the like, or composite oxides thereof may be included. Among these, activated alumina, zirconia and ceria are preferable, and activated alumina is particularly preferable. In addition, the refractory inorganic oxide may be the same as or different from the refractory inorganic oxide (B). In addition, the refractory inorganic oxide may be used either alone or in a mixed form of 2 or more members.

In the above step, although the amount of the catalytically active component (II) to be supported on the precursor catalyst (I) is not especially limited, the amount to be specified in the amount of the catalytically active component (II) is preferable.

A method for supporting the catalytically active component (II) on the precursor catalyst (I) is not especially limited, and a similar method for supporting the catalytically active component (I) on the refractory three-dimensional structure can be used. Specifically, the precursor catalyst (I) may be charged and impregnated into the aqueous slurry containing the catalytically active component (II). In this case, impregnation conditions are not especially limited, as long as it provide sufficient and uniform mixing of the catalytically active component (II) with the precursor catalyst (I), and the catalytically active component (II) can be sufficiently supported on the precursor catalyst (I) in the subsequent drying and calcining steps. For example, the precursor catalyst (I) may be impregnated in the aqueous slurry containing the catalytically active component (II); subsequently, the precursor catalyst (I) may be pulled out from the aqueous slurry containing the catalytically active component (II), followed by removing excess aqueous slurry containing the catalytically active component (II). Then, the precursor catalyst (I) may be dried at 100 to 200° C. for 0.2 to 1 hour and further calcined at 350 to 600° C. for 0.4 to 2 hours, to make the catalytically active component (II) supported on the precursor catalyst (I) and to produce a catalyst for the exhaust gas purification of the present invention.

The third aspect of the present invention is to provide a method for the production of a catalyst for the exhaust gas purification which comprises mixing a catalytically active component (II) in an aqueous medium to prepare a slurry, charging a refractory three-dimensional structure into the slurry, removing excess slurry, drying and calcining the refractory three-dimensional structure, and mixing a catalytically active component (I) in an aqueous medium to prepare a slurry, charging the refractory three-dimensional structure into the slurry, removing excess slurry, drying and optionally calcining the refractory three-dimensional structure. To be brief, the present method comprises, first of all, supporting the catalytically active component (II) on the refractory three-dimensional structure to yield a precursor catalyst (II), and subsequently comprises a step of supporting the catalytically active component (I) on the precursor catalyst (II). Specifically, the similar method and conditions as defined in the second aspect of the present invention may be applied, except that the addition order of the catalytically active component (I) and the catalytically active component (II) is reversed. Therefore, explanation of the third aspect of the present invention will be omitted herein.

A fourth aspect of the present invention is to provide a method for the production of a catalyst for the exhaust gas purification which comprises mixing a catalytically active component (I) and a catalytically active component (II) to prepare a slurry, charging a refractory three-dimensional structure into the slurry, and drying and optionally calcining the refractory three-dimensional structure to produce the catalyst for the exhaust gas purification of the present invention. Specifically, the method comprises supporting the catalytically active component (I) and the catalytically active component (II) at the same time on the refractory three-dimensional structure.

In the above step, aqueous slurry containing the catalytically active components (I/II) may be preferably prepared by dissolving/dispersing the catalytically active components (I) and (II) in a suitable aqueous medium, before being supported on the refractory three-dimensional structure, to yield a solution/dispersion of the catalytically active component (I/II), and then subjecting the resultant solution/dispersion of the catalytically active component (I/II) to wet-milling using a ball mill or the like. In this case, the catalytically active components (I) and (II) may be dissolved/dispersed into one suitable aqueous medium as a whole, or may be dissolved/dispersed separately into different or the same suitable aqueous medium(s) and then combined these solutions/dispersed solutions. In consideration of operational easiness, it is preferable to prepare the solution/dispersed solution of the catalytically active components (I/II) by dissolving/dispersing the catalytically active components (I) and (II) in a suitable aqueous medium, as a whole. As the aqueous medium suitably used herein, water; lower alcohols such as cyclohexanol, ethanol, and 2-propanol, and the like; and aqueous solution of organic type alkaline, and the like may be included. Among these, water, and lower alcohols may be preferably used, and water may be particularly used. In this case, the amounts of the catalytically active components (I) and (II) to be added are not especially limited, as long as the catalytically active components (I) and (II) can be supported in desired amounts on the refractory three-dimensional structure. Such amount is preferable so as to give a concentration of the catalytically active component (I) in the aqueous medium in the range of 10 to 30% by weight, and more preferably 15 to 25% by weight, and to also give a concentration of the catalytically active component (II) in the aqueous medium in the range of 10 to 30% by weight, and more preferably 15 to 25% by weight. In addition, the wet-milling of the solution/dispersion containing the catalytically active component (I/II) may be carried out by a usually well-known method, and not especially limited.

In the above step, the aqueous slurry containing the catalytically active component (I/II) may further contain, in addition to the catalytically active components (I) and (II), another component(s) (additional component(s)). As the additional component, rare earth metals such as scandium (Sc), yttrium (Y), lanthanum (La), cerium (Ce), praseodymium (Pr), and neodymium (Nd); metals such as zirconium (Zr), iron (Fe), cobalt (Co) and nickel (Ni); oxides of the above-described metals; composite oxides of the above-described metals and the like may be included. Among these, oxides of Zr, Ce, La, Y, Nd, and Pr, or composite oxides thereof are preferable, and oxides of Zr, Ce, and La, or composite oxides thereof are more preferable. Such an additional component may be used either alone or in a mixed form of 2 or more members. In addition, the amount of the additional component to be added is not especially limited, as long as not to inhibit action by the catalytically active components (I) and (II). The amount of the component to be added is preferably in the range of 5 to 400% by weight, and more preferably 10 to 200% by weight, based on the total weight of the catalytically active components (I) and (II).

In the case where the solution/dispersion of the catalytically active component (I/II) contains an additional component, the solution/dispersion of the catalytically active component (I/II) may further contain a refractive inorganic oxide in addition to the additional component. As the refractory inorganic oxide, a refractory inorganic oxide which has been usually used in exhaust gas processing may be used, and similar one specified by the solution/dispersion of the catalytically active component (I) or the solution/dispersion of the catalytically active component (II) may be used. In addition, the refractory inorganic oxide may be the same as or different from the refractory inorganic oxide (A) or (B). In addition, the refractory inorganic oxide may be used either alone or in a mixed form of 2 or more members.

The refractory three-dimensional structure is not especially limited, and similar well-known material may be used. Specifically, similar to one exemplified in the second aspect of the present invention may be used.

In the above step, although the amounts of the catalytically active components (I) and (II) to be supported on the refractory three-dimensional structure are not especially limited, the amounts to be specified in the amount of the catalytically active components (I) and (II) are preferable.

A method for supporting the catalytically active components (I) and (II) on the refractory three-dimensional structure is not especially limited, and a well-known method for supporting a catalyst can be applied similarly, or by suitable modification. Specifically, the refractory three-dimensional structure may be charged and impregnated into the aqueous slurry containing the catalytically active component (I/II). In this case, impregnation conditions are not especially limited, as long as it provide sufficient and uniform mixing of the catalytically active components (I) and (II) with the refractory three-dimensional structure, and the catalytically active components (I) and (II) can be sufficiently supported on the refractory three-dimensional structure in the subsequent drying and calcining steps. For example, the refractory three-dimensional structure may be impregnated in the aqueous slurry containing the catalytically active component (I/II); subsequently, the refractory three-dimensional structure may be pulled out from the aqueous slurry containing the catalytically active component (I/II), followed by removing excess aqueous slurry containing the catalytically active component (I/II). Then, the refractory three-dimensional structure may be dried at 100 to 200° C. for 0.2 to 1 hour and further calcined at 350 to 600° C. for 0.4 to 2 hours, to make the catalytically active components (I) and (II) supported on the refractory three-dimensional structure and to produce a catalyst for the exhaust gas purification of the present invention.

(Method for Purification of Exhaust Gas)

The catalyst for the exhaust gas purification of the present invention can be used to efficiently purify an exhaust gas, by contacting with the exhaust gas, for example, an exhaust gas from gasoline-containing fuel. In particular, it can serve as a three way catalyst. Namely, the catalyst is excellent in catalytic activity at a low temperature, in particular, NOx purification performance under rich conditions.

Therefore, a fifth aspect of the present invention relates to a method for purifying an exhaust gas which comprises a step of contacting the exhaust gas with the catalyst for the exhaust gas purification of the present invention.

The catalyst for the exhaust gas purification of the present invention can be used to purify an exhaust gas from an internal combustion engine such as a diesel engine, a gasoline engine, or the like. In particular, because of being effective in removing NOx under rich conditions, it is preferable to purify an exhaust gas from a gasoline engine. Namely, an exhaust gas can be purified by mounting the catalyst for the exhaust gas purification therein. In the present invention, the position of the catalyst for the exhaust gas purification to be mounted is not especially limited. The catalyst for the exhaust gas purification may be mounted at the upstream side of exhaust gas flow, and a hydrocarbon adsorbing agent may be mounted at the downstream side; or a hydrocarbon adsorbing agent may be mounted at the upstream side of exhaust gas flow, and the catalyst for the exhaust gas purification may be mounted at the downstream side; or the like, so as to purify the exhaust gas. Adoption of these methods is capable of efficiently purifying an exhaust gas.

EXAMPLE

The present invention will be explained in more detail below with reference to Examples. However, the present invention should by no means limited to these Examples.

Example 1

Into 100 mL of an aqueous solution of barium acetate (containing 5.4 g as a barium oxide) and palladium nitrate (containing 6 g as palladium), 120 g of activated alumina ($\gamma$-$Al_2O_3$, a specific surface area of 150 $m^2/g$) was impregnated, followed by drying at 150° C. for 20 minutes, and calcining at 500° C. for 1 hour. Then, the resultant powders were mixed with 90 g of a composite oxide of ceria and zirconia containing lanthanum oxide (weight ratio of La/Ce/Zr=10/30/60, converted as oxides), 150 g of activated alumina ($\gamma$-$Al_2O_3$, a specific surface area of 150 $m^2/g$), and 350 g of purified water. Then, the resultant mixture was wet-milled by a ball mill, to yield an aqueous slurry containing Pd.

Into an aqueous solution of platinum dinitrodiamine (containing 1.0 g as platinum) and rhodium nitrate (containing 1.0 g as rhodium), 120 g of zirconia (a specific surface area of 100 $m^2/g$) was impregnated, followed by drying at 150° C. for 20 minutes, and calcining at 500° C. for 1 hour. Then, the resultant powders were mixed with 80 g of a composite oxide of ceria and zirconia containing lanthanum oxide (weight ratio of La/Ce/Zr=10/30/60, converted as oxides), 120 g of activated alumina ($\gamma$-$Al_2O_3$, a specific surface area of 150 $m^2/g$), and 320 g of purified water. Then, the resultant mixture was wet-milled by a ball mill, to yield aqueous slurry containing Pt/Rh.

Into the aqueous slurry containing Pd, a monolithic carrier (0.07 liter) made of cordierite and having 600 cells per square inch of the cross-sectional area was impregnated, and after the carrier was taken out, excess slurry in the cell was blown out by compressed air, followed by drying at 150° C. for 20 minutes, and calcining at 500° C. for 1 hour, to yield a precursor catalyst containing palladium.

The resultant precursor catalyst was impregnated into the aqueous slurry containing Pt/Rh, and after the precursor catalyst was taken out, excess slurry in the cell was blown out by compressed air, followed by drying at 150° C. for 20 minutes, and calcining at 500° C. for 1 hour, to yield a catalyst (A) having palladium in a lower layer, and rhodium and platinum in a surface layer. Composition of this completed catalyst is shown in Table 1. Note that, in Table 1, each amount of the catalyst components to be supported is shown as supporting amount (g) per liter of the catalyst.

Example 2

Into 50 mL of an aqueous solution of platinum dinitrodiamine (containing 0.75 g as platinum), and rhodium nitrate (containing 0.75 g as rhodium), 90 g of zirconia (a specific surface area of 100 $m^2/g$) was impregnated, followed by drying at 150° C. for 20 minutes, and calcining at 500° C. for 1 hour. Then, the resultant powders were mixed with 60 g of a composite oxide of ceria and zirconia containing lanthanum oxide (weight ratio of La/Ce/Zr=10/30/60, converted as oxides), 210 g of activated alumina ($\gamma$-$Al_2O_3$, a specific surface area of 150 $m^2/g$), and 350 g of purified water. Then, the resultant mixture was wet-milled by a ball mill, to yield aqueous slurry containing Pt/Rh.

Into 150 mL of an aqueous solution of barium acetate (containing 7.2 g as a barium oxide) and palladium nitrate (containing 8 g as palladium), 160 g of activated alumina ($\gamma$-$Al_2O_3$, a specific surface area of 150 $m^2/g$) was impregnated, followed by drying at 150° C. for 20 minutes, and calcining at 500° C. for 1 hour. Then, the resultant powders were mixed with 120 g of a composite oxide of ceria and zirconia containing lanthanum oxide (weight ratio of La/Ce/Zr=10/30/60, converted as oxides), 40 g of activated alumina ($\gamma$-$Al_2O_3$, a specific surface area of 150 $m^2/g$), and 330 g of purified water. Then, the resultant mixture was wet-milled by a ball mill, to yield aqueous slurry containing Pd.

Into the aqueous slurry containing Pd, a monolithic carrier (0.07 liter) made of cordierite and having 600 cells per square inch of the cross-sectional area was impregnated, and after the carrier was taken out, excess slurry in the cell was blown out by compressed air, followed by drying at 150° C. for 20 minutes, and calcining at 500° C. for 1 hour, to yield a precursor catalyst containing platinum and rhodium.

The resultant precursor catalyst was impregnated into the aqueous slurry containing Pd, and after the precursor catalyst was taken out, excess slurry in the cell was blown out by compressed air, followed by drying at 150° C. for 20 minutes, and calcining at 500° C. for 1 hour, to yield a catalyst (B) having rhodium and platinum in a lower layer, and palladium in a surface layer. Composition of this completed catalyst is shown in Table 1.

Example 3

A catalyst (C), having palladium in a lower layer, and rhodium and platinum in a surface layer, was obtained in the same way as in Example 1, except that activated alumina was changed to activated alumina containing 3% by weight as lanthanum oxide, and further zirconia was changed to zirconia containing 20% by weight as neodymium oxide, in Example 1. Composition of this completed catalyst is shown in Table 1.

Example 4

Into 150 mL of an aqueous solution of barium acetate (containing 7.2 g as a barium oxide) and palladium nitrate (containing 8 g as palladium), 160 g of activated alumina ($\gamma$-$Al_2O_3$, a specific surface area of 150 $m^2/g$) was impregnated, followed by drying at 150° C. for 20 minutes, and calcining at 500° C. for 1 hour.

Into 100 mL of an aqueous solution of platinum dinitrodiamine (containing 1.0 g as platinum), and rhodium nitrate (containing 1.0 g as rhodium), 120 g of zirconia (a specific surface area of 100 $m^2/g$) was impregnated, followed by drying at 150° C. for 20 minutes, and calcining at 500° C. for 1 hour.

Then, each of the resultant powders were mixed with 200 g of a composite oxide of ceria and zirconia containing lanthanum oxide (weight ratio of La/Ce/Zr=10/30/60, converted as oxides), 320 g of activated alumina ($\gamma$-$Al_2O_3$, a specific surface area of 150 $m^2/g$), and 320 g of purified water. Then, the resultant mixture was wet-milled by a ball mill, to yield aqueous slurry containing Pt/Pd/Rh.

Into the resultant aqueous slurry, a monolithic carrier (0.07 liter) made of cordierite and having 600 cells per square inch of the cross-sectional area was impregnated, and after the carrier was taken out, excess slurry in the cell was blown out by compressed air, followed by drying at 150° C. for 20 minutes, and calcining at 500° C. for 1 hour, to yield a catalyst (D) containing platinum, rhodium and palladium. Composition of this completed catalyst is shown in Table 1.

Example 5

A catalyst (E), having palladium in a lower layer, and rhodium and platinum in a surface layer, was obtained in the same way as in Example 1, except that powders were obtained by impregnating 120 g of activated alumina ($\gamma$-$Al_2O_3$, a specific surface area of 150 m$^2$/g), and 8.2 g of barium sulfate into 100 mL of an aqueous solution of palladium nitrate (containing 6 g as palladium), followed by drying at 150° C. for 20 minutes, and calcining at 500° C. for 1 hour. Composition of this completed catalyst is shown in Table 1.

Example 6

A catalyst (F), having palladium in a lower layer, and rhodium and platinum in a surface layer, was obtained in the same way as in Example 1, except that amount of barium acetate used (supported) was increased from 5.4 g to 18 g, as barium oxide, in Example 1. Composition of this completed catalyst is shown in Table 1.

Comparative Example 1

Into 200 mL of an aqueous solution of barium acetate (containing 7.2 g as a barium oxide), palladium nitrate (containing 8 g as palladium), platinum dinitrodiamine (containing 1.0 g as platinum), and rhodium nitrate (containing 1.0 g as rhodium), 280 g of activated alumina ($\gamma$-$Al_2O_3$, a specific surface area of 150 m$^2$/g) was impregnated, followed by drying at 150° C. for 20 minutes, and calcining at 500° C. for 1 hour.

The resultant powders were mixed with 120 g zirconia (a specific surface area of 100 m$^2$/g), 200 of a composite oxide of ceria and zirconia containing lanthanum oxide (weight ratio of La/Ce/Zr=10/30/60, converted as oxides), 200 g of activated alumina ($\gamma$-$Al_2O_3$, a specific surface area of 150 m$^2$/g), and 800 g of purified water. Then, the resultant mixture was wet-milled by a ball mill, to yield aqueous slurry containing Pt/Pd/Rh.

Into the resultant slurry, a monolithic carrier (0.07 liter) made of cordierite and having 600 cells per square inch of the cross-sectional area was impregnated, and after the carrier was taken out, excess slurry in the cell was blown out by compressed air, followed by drying at 150° C. for 20 minutes, and calcining at 500° C. for 1 hour, to yield a catalyst (G) containing palladium, platinum and rhodium. Composition of this completed catalyst is shown in Table 1.

Comparative Example 2

Into 100 mL of an aqueous solution of palladium acetate (containing 6 g as palladium), 120 g of activated alumina ($\gamma$-$Al_2O_3$, a specific surface area of 150 m$^2$/g) was impregnated, followed by drying at 150° C. for 20 minutes, and calcining at 500° C. for 1 hour. The resultant powders were mixed with 90 g of a composite oxide of ceria and zirconia containing lanthanum oxide (weight ratio of La/Ce/Zr=10/30/60, converted as oxides), 150 g of activated alumina ($\gamma$-$Al_2O_3$, a specific surface area of 150 m$^2$/g), and 350 g of purified water. The resultant mixture was wet-milled by a ball mill, to yield aqueous slurry containing Pd.

Into 100 mL of an aqueous solution of barium acetate (containing 5.4 g as a barium oxide), platinum dinitrodiamine (containing 1.0 g as platinum), and rhodium nitrate (containing 1.0 g as rhodium), 120 g of zirconia (a specific surface area of 100 m$^2$/g) was impregnated, followed by drying at 150° C. for 20 minutes, and calcining at 500° C. for 1 hour. The resultant powders were mixed with 80 of a composite oxide of ceria and zirconia containing lanthanum oxide (weight ratio of La/Ce/Zr=10/30/60, converted as oxides), 120 g of activated alumina ($\gamma$-$Al_2O_3$, a specific surface area of 150 m$^2$/g), and 300 g of purified water. Then, the resultant mixture was wet-milled by a ball mill, to yield aqueous slurry containing Pt/Rh.

Into the slurry containing Pd, a monolithic carrier (0.07 liter) made of cordierite and having 600 cells per square inch of the cross-sectional area was impregnated, and after the carrier was taken out, excess slurry in the cell was blown out by compressed air, followed by drying and calcining, to yield a precursor catalyst containing palladium. The resultant precursor was impregnated into the slurry containing Pt/Rh, and after the precursor was taken out, excess slurry in the cell was blown out by compressed air, followed by drying at 150° C. for 20 minutes, and calcining at 500° C. for 1 hour, to yield a catalyst (H) having palladium in a lower layer, and rhodium and platinum in a surface layer. Composition of this completed catalyst is shown in Table 1.

Example 7

Into 100 mL of an aqueous solution of barium acetate (containing 1.5 g as a barium oxide) and palladium nitrate (containing 3 g as palladium), 120 g of activated alumina ($\gamma$-$Al_2O_3$, a specific surface area of 150 m$^2$/g) was impregnated, followed by drying at 150° C. for 20 minutes, and calcining at 500° C. for 1 hour. Then, the resultant powders were mixed with 90 g of a composite oxide of ceria and zirconia containing lanthanum oxide (weight ratio of La/Ce/Zr=10/30/60, converted as oxides), 150 g of activated alumina ($\gamma$-$Al_2O_3$, a specific surface area of 150 m$^2$/g), and 350 g of purified water. Then, the resultant mixture was wet-milled by a ball mill, to yield aqueous slurry containing Pd.

Into 100 mL of an aqueous solution of platinum dinitrodiamine (containing 0.4 g as platinum) and rhodium nitrate (containing 1.2 g as rhodium), 120 g of zirconia (a specific surface area of 100 m$^2$/g) was impregnated, followed by drying at 150° C. for 20 minutes, and calcining at 500° C. for 1 hour. Then, the resultant powders were mixed with 80 g of a composite oxide of ceria and zirconia containing lanthanum oxide (weight ratio of La/Ce/Zr=10/30/60, converted as oxides), 120 g of activated alumina ($\gamma$-$Al_2O_3$, a specific surface area of 150 m$^2$/g), and 300 g of purified water. Then, the resultant mixture was wet-milled by a ball mill, to yield aqueous slurry containing Pt/Rh.

Into the aqueous slurry containing Pd, a monolithic carrier (0.07 liter) made of cordierite and having 600 cells per square inch of the cross-sectional area was impregnated, and after the carrier was taken out, excess slurry in the cell was blown out by compressed air, followed by drying at 150° C. for 20 minutes, and calcining at 500° C. for 1 hour, to yield a precursor catalyst containing palladium.

The resultant precursor catalyst was impregnated into the aqueous slurry containing Pt/Rh, and after the precursor catalyst was taken out, excess slurry in the cell was blown out by compressed air, followed by drying at 150° C. for 20 minutes, and calcining at 500° C. for 1 hour, to yield a catalyst (I) having palladium in a lower layer, and rhodium and platinum in a surface layer. Composition of this completed catalyst is shown in Table 1.

Example 8

A catalyst (J), having palladium in a lower layer, and rhodium and platinum in a surface layer, was obtained in the same way as in Example 7, except that amount of barium acetate to be used (supported) was increased from 1.5 g to 3 g, as barium oxide, in Example 7. Composition of this completed catalyst is shown in Table 3.

Example 9

A catalyst (K), having palladium in a lower layer, and rhodium and platinum in a surface layer, was obtained in the same way as in Example 7, except that amount of barium acetate to be used (supported) of barium acetate was increased from 1.5 g to 4.5 g, as barium oxide, in Example 7. Composition of this completed catalyst is shown in Table 3.

Example 10

A catalyst (L), having palladium in a lower layer, and rhodium and platinum in a surface layer, was obtained in the same way as in Example 7, except that amount of barium acetate to be used (supported) of barium acetate was increased from 1.5 g to 9 g, as barium oxide, in Example 7. Composition of this completed catalyst is shown in Table 3.

Three way performance of the catalyst was evaluated under conditions as of an entrance temperature of the catalyst of 500° C. and a space velocity of 130,000 hr$^{-1}$.

In this case, a sine waveform signal of 1 Hz was introduced from an external oscillator to an engine control unit. Average air-fuel ratio was continuously changed by varying air-fuel ratio (A/F) within ±0.5 A/F at 1 Hz. Simultaneously, gas compositions were analyzed at the entrance and exit of the catalyst, to determine purification ratio of CO, THC and NO at average air-fuel ratio A/F from 14.1 to 15.1.

The purification ratios of CO, THC and NO thus obtained were plotted on a graph relative to the air-fuel ratio, to prepare a three-way characteristics curve. Purification ratio at cross point (COP) between the purification curves of CO and NO, and purification ratio of NO at A/F=14.2 are shown in Tables 2 and 4.

In addition, ignition performance of each of the catalysts after the durability test was evaluated in an engine exhaust gas system equipped with a heat exchanger at the front of a catalyst converter, by analyzing gas compositions at the entrance and exit of the catalyst and determining purification ratios of CO, THC and NO under conditions of A/F=14.6±0.51 at 1 Hz, and by continuously varying entrance temperature of the catalyst from 200° C. to 500° C. Temperature where purification ratios of CO, THC and NO reach 50% (light-off temperature) is shown in Tables 2 and 4.

TABLE 1

|  |  | Ba/Pd (molar ratio) | Lower layer (Single layer for catalysts D and G) |  |  |  |  |  | Surface layer |  |  |  |  |  |  |
|---|---|---|---|---|---|---|---|---|---|---|---|---|---|---|---|
|  |  |  | Precious metal | BaO | $Al_2O_3$ | $La_2O_3$ | $CeO_2$ | $ZrO_2$ | Precious metal | BaO | $Al_2O_3$ | $La_2O_3$ | $CeO_2$ | $Nd_2O_3$ | $ZrO_2$ |
| Example | Catalyst A | 0.62 | Pd = 2.0 | 1.8 | 90 | 3 | 9 | 18 | Pt = 0.25 Rh = 0.25 | 0 | 30 | 2 | 6 | 0 | 42 |
|  | Catalyst B | 0.62 | Pt = 0.25 Rh = 0.25 | 0 | 70 | 2 | 6 | 42 | Pd = 2.0 | 1.8 | 50 | 3 | 9 | 0 | 18 |
|  | Catalyst C | 0.62 | Pd = 2.0 | 1.8 | 87.3 | 5.7 | 9 | 18 | Pt = 0.25 Rh = 0.25 | 0 | 29.1 | 2.9 | 6 | 6 | 36 |
|  | Catalyst D | 0.62 | Pd = 2.0 Pt = 0.25 Rh = 0.25 | 1.8 | 120 | 5 | 15 | 60 | — | — | — | — | — | — | — |
|  | Catalyst E | 0.62 | Pd = 2.0 | 1.8* | 90 | 3 | 9 | 18 | Pt = 0.25 Rh = 0.25 | 0 | 30 | 2 | 6 | 0 | 42 |
|  | Catalyst F | 2.08 | Pd = 2.0 | 6 | 90 | 3 | 9 | 18 | Pt = 0.25 Rh = 0.25 | 0 | 30 | 2 | 6 | 0 | 42 |
| C. Expl. | Catalyst G | 0.62 | Pd = 2.0 Pt = 0.25 Rh = 0.25 | 1.8 | 120 | 5 | 15 | 60 | — | — | — | — | — | — | — |
|  | Catalyst H | 0.62 | Pd = 2.0 | 0 | 90 | 3 | 9 | 18 | Pt = 0.25 Rh = 0.25 | 0 | 30 | 2 | 6 | 0 | 42 |

All show a supported amount (g) per liter of catalyst
*: 2.7 as $BaSO_4$
C. Expl.: Comparative Example (Evaluation of the Catalysts)

Using a commercially available electronic control type engine (6 cylinder, 3000 cc), a durability test was executed by connecting a multi-converter filled with each of the catalysts in series to the exhaust gas system of the engine. The engine was run in operation mode under 20 seconds of steady state operation and 6 seconds of deceleration (fuel was cut during deceleration which resulted in exposure of the catalyst to severe conditions as of at high temperature in an oxidation atmosphere). In this case, the catalyst was tested for durability for 100 hours under conditions as of a temperature of the catalyst part of 900° C. in steady state operation.

Performance of the catalyst after subjected to the durability test was evaluated using a commercially available electronic control type engine (2400 cc, 4-cylinder engine), by connecting a multi-converter filled with each of the catalysts in series to the exhaust gas system of the engine.

TABLE 2

|  |  | COP (%) | NOx purification ratio at A/F = 14.2(%) | Light-off performance T50/° C. |  |  |
|---|---|---|---|---|---|---|
|  |  |  |  | CO | THC | NO |
| Example 1 | Catalyst A | 92 | 71 | 352 | 358 | 353 |
| Example 2 | Catalyst B | 92 | 70 | 356 | 361 | 356 |
| Example 3 | Catalyst C | 94 | 73 | 341 | 354 | 344 |
| Example 4 | Catalyst D | 85 | 60 | 380 | 384 | 379 |
| Example 5 | Catalyst E | 88 | 69 | 368 | 376 | 369 |
| Example 6 | Catalyst F | 79 | 50 | 384 | 391 | 385 |
| C. Expl. 1 | Catalyst G | 75 | 14 | 390 | 391 | 390 |
| C. Expl. 2 | Catalyst H | 73 | 10 | 401 | 402 | 402 |

C. Expl.: Comparative Example

TABLE 3

| | | Ba/Pd | Precious | Lower layer | | | | | Surface layer | | | | | |
|---|---|---|---|---|---|---|---|---|---|---|---|---|---|---|
| | | (mol ratio) | metal | BaO | Al$_2$O$_3$ | La$_2$O$_3$ | CeO$_2$ | ZrO$_2$ | BaO | Al$_2$O$_3$ | La$_2$O$_3$ | CeO$_2$ | Nd$_2$O$_3$ | ZrO$_2$ |
| Expl. | Catalyst I | 0.35 | Pd = 1.0 | 0.5 | 90 | 3 | 9 | 18 | 0 | 30 | 2 | 6 | 0 | 42 |
| | Catalyst J | 0.70 | Pd = 1.0 | 1.0 | 90 | 3 | 9 | 18 | 0 | 30 | 2 | 6 | 0 | 42 |
| | Catalyst K | 1.04 | Pd = 1.0 | 1.5 | 90 | 3 | 9 | 18 | 0 | 30 | 2 | 6 | 0 | 42 |
| | Catalyst L | 2.08 | Pd = 1.0 | 3.0 | 90 | 3 | 9 | 18 | 0 | 30 | 2 | 6 | 0 | 42 |

All show a supported amount (g) per liter of catalyst

TABLE 4

| | | COP | NOx purification ratio at | Light-off performance T50/° C. | | |
|---|---|---|---|---|---|---|
| | | (%) | A/F = 14.2 (%) | CO | THC | NO |
| Example 7 | Catalyst I | 76 | 66 | 364 | 376 | 371 |
| Example 8 | Catalyst J | 68 | 56 | 369 | 384 | 375 |
| Example 9 | Catalyst K | 65 | 52 | 373 | 389 | 383 |
| Example 10 | Catalyst L | 56 | 43 | 384 | 397 | 391 |

Tables 2 and 4 show that the catalysts of the present invention show excellent ignition performance, and high NOx purification performance under rich conditions, as compared with those of the catalysts in Comparative Examples 1 and 2. In particular, it is noted that the catalyst systems of Examples 1 to 5, where molar ration of Ba/Pd is set below 1, show excellent ignition performance, and high NOx purification performance under rich conditions. Furthermore, these effects are exerted more apparently in the catalysts of Examples 1 to 3 and 5 where a layer of palladium and barium, and a layer of rhodium and platinum are separately formed, than the catalyst of Example 4 where palladium, barium and rhodium are arranged in the same layer.

The invention claimed is:

1. A catalyst for the exhaust gas purification which comprises:
    a catalytically active component (I) having palladium and barium supported on a refractory inorganic oxide (A); and
    a catalytically active component (II) having either rhodium or a mixture of rhodium and platinum, and an additional component on a refractory inorganic oxide (B),
    wherein the molar ratio of barium to palladium (molar ratio of barium/palladium) in the catalytically active component (I) is 0.1 to 2, and provided that when rhodium and platinum are used in combination, a weight ratio of platinum/rhodium is 1/5 to 5,
    wherein the additional component is at least one member selected from the group consisting of scandium (Sc), yttrium (Y), lanthanum (La), cerium (Ce), praseodymium (Pr), neodymium (Nd), zirconium (Zr), iron (Fe), cobalt (Co), nickel (Ni), and oxides and composite oxides thereof, and the amount of the additional component to be added being in the range of 1 to 100 g, per liter of the catalyst for the exhaust gas purification,
    wherein the amount of the catalytically active component (I) to be supported is in the range of 10 to 300 g, per liter of the catalyst for the exhaust gas purification, and
    wherein the amount of the catalytically active component (II) to be supported is in the range of 10 to 300 g, per liter of the catalyst for the exhaust gas purification.

2. The catalyst for the exhaust gas purification according to claim 1, wherein the molar ratio of barium to palladium (molar ratio of barium/palladium) in the catalytically active component (I) is not less than 0.1 and below 1.

3. The catalyst for the exhaust gas purification according to claim 1, which comprises a surface layer containing the catalytically active component (I) and a lower layer containing the catalytically active component (II).

4. The catalyst for the exhaust gas purification gas according to claim 1, which comprises a surface layer containing the catalytically active component (II) and a lower layer containing the catalytically active component (I).

5. The catalyst for the exhaust gas purification according to claim 1, which comprises a layer containing the catalytically active component (I) and the catalytically active component (II).

6. The catalyst for the exhaust gas purification according to claim 1, wherein the weight ratio of the catalytically active component (I) and the catalytically active component (II) (weight ratio of catalytically active component (I) : catalytically active component (II)) is in the range of 1:30 to 30:1.

7. The catalyst for the exhaust gas purification according to claim 1, wherein the catalytically active component (II) further comprises oxides of Zr, Ce, La, Y, Nd, or Pr, or composite oxides thereof.

8. The catalyst for the exhaust gas purification according to claim 1, wherein the catalytically active component (II) further comprises oxides of Zr, Ce, La, or Nd, or composite oxides thereof.

9. The catalyst for the exhaust gas purification according to claim 1, wherein the molar ratio of barium/palladium in the catalytically active component (I) is 0.35 to 2.

* * * * *